United States Patent
Lampkins et al.

(10) Patent No.: US 9,450,938 B1
(45) Date of Patent: Sep. 20, 2016

(54) INFORMATION SECURE PROACTIVE MULTIPARTY COMPUTATION (PMPC) PROTOCOL WITH LINEAR BANDWIDTH COMPLEXITY

(71) Applicant: HRL Laboratories, LLC, Malibu, CA (US)

(72) Inventors: Joshua D. Lampkins, Gardena, CA (US); Karim El Defrawy, Santa Monica, CA (US); Joshua W. Baron, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/449,868

(22) Filed: Aug. 1, 2014

Related U.S. Application Data

(63) Continuation-in-part of application No. 14/207,483, filed on Mar. 12, 2014.

(60) Provisional application No. 61/780,757, filed on Mar. 13, 2013, provisional application No. 61/861,334, filed on Aug. 1, 2013, provisional application No. 61/861,325, filed on Aug. 1, 2013.

(51) Int. Cl.
*H04L 29/06* (2006.01)
*H04L 29/08* (2006.01)

(52) U.S. Cl.
CPC .............. *H04L 63/08* (2013.01); *H04L 67/10* (2013.01)

(58) Field of Classification Search
CPC ...... H04L 9/085; H04L 9/302; H04L 9/3247
USPC ............................................................ 726/26
See application file for complete search history.

(56) References Cited

U.S. PATENT DOCUMENTS

| | | | |
|---|---|---|---|
| 5,625,692 A * | 4/1997 | Herzberg et al. | 380/286 |
| 6,035,041 A * | 3/2000 | Frankel et al. | 380/30 |
| 7,003,677 B1 * | 2/2006 | Herzberg et al. | 713/180 |
| 7,313,701 B2 * | 12/2007 | Frankel et al. | 713/180 |
| 8,824,672 B1 | 9/2014 | Gomathisankaran | |

(Continued)

OTHER PUBLICATIONS

Bai, Li, and XuKai Zou. "A proactive secret sharing scheme in matrix projection method." International Journal of Security and Networks 4.4 (2009): 201-209.*

(Continued)

*Primary Examiner* — Syed Zaidi
(74) *Attorney, Agent, or Firm* — Tope-McKay & Associates

(57) ABSTRACT

Described is system for secure proactive multi-party computation. The system securely evaluates a circuit in the presence of an adversary. The circuit receives inputs of secret values from a set of servers. A RobustShare protocol is initialized to allow each server to distribute their secret values among the other servers. A RauDouSha protocol is initialized to generate random sharings of the secret values. A Block-Redistribute protocol is initialized to redistribute the secret values amount the set of servers. For each layer of the circuit, a permutation of the secret values is performed, and each layer of the circuit is evaluated. The Block-Redistribute is protocol is initialized to re-randomize the secret values such that privacy of the secret values is preserved. A sharing of the secret values is determined for each output gate, and a Reco protocol is initialized to reveal each sharing of secret values to an intended recipient.

20 Claims, 4 Drawing Sheets

(56) References Cited

U.S. PATENT DOCUMENTS

2004/0139146 A1    7/2004    Coachin
2010/0037055 A1*  2/2010    Fazio et al. .................. 713/171

OTHER PUBLICATIONS

Harn Lein, and Changlu Lin. "Strong (n, t, n) verifiable secret sharing scheme." Information Sciences 180.16 (2010): 3059-3064.*

Alfred V. Aho, John E. Hopcroft, and J. D. Ullman, The Design and Analysis of Computer Aigorithms. Addison-Westay, pp. 299-300, 1974.

Vaclav E. Benes. Optimal rearrangeable multistage connecting networks. The Bell System Technical Journal, 43 (4):1641-1656, Jul. 1964.

Elwyn R. Berlekamp. Algebraic Coding Theory Aegean Park Press, 1984, Chapter 7.

Michael Ben-Or, Shafi Goldwasser, and Avi Wigderson, Completeness theorems for non-cryptographic fault-tolerant distributed computation (extended abstract). In STOC, pp. 1-10, 1988.

Gabriel Bracha. An O(log n) expected rounds randomized byzantine generals pro ocol. J. ACM, 34(4):910-920, 1987.

Eli Ben-Sasson, Serge Fehr, and Rafail Ostrovsky. Near-linear unconditionally-secure multiparty computation with a dishonest minority. Cryptology ePrint Archive, Report 2011/629, 2011.

Zuzana Beerfiova-Trubiniova and Martin Hirt. Efficient multi-party computation with dispute control. In TCC, pp. 305-328, 2006.

Zuzana Beerflova-Trubiniova and Martin Hirt. Perfectly-secure mpc with linear communication complexity. In TCC, pp. 213-230, 2008.

Ivan Damgard. Yuval Ishai, Mikkel Kroigaard, Jesper Buus Nielsen, and Adam Smith. Scalable multiparty computatation with nearly optimal work and resilience. In CRYPTO, pp. 241-261, 2008.

Ivan Damgard, Yuval Ishai, and Mikkel Kroigaard. Perfectly secure multiparty computation and the computational overhead of cryptography. In EUROCRYPT, pp. 445-465, 2010.

Michael J. Fischer and Nancy A. Lynch. A lower bound for the time to assure interactive consistency. Inf. Process. Lett., 14(4):183-186, 1982.

Shuhong Gao. A new algorithm for decoding read-solomon codes. In Communications, Information and Network Security, Editors V.Bhargave, H.V.Poor, V.Tarokh, and S.Yoon, pp. 55-68. Kluwer, 2002.

Craig Gentry, Shai Halevi, and Nigel P. Smart. Fully homomorphic encryption with polylog overhead. In EURO-CRYPT, pp. 465-482, 2012.

Frank Thomson Leighton. Introduction to parallel atgonthms and architectures: arrays, trees, hypercubes. Morgan Kaufmann, 1992, section 3.2.

Rafail Ostrovsky and Moti Yung. How to withstand mobile virus attacks (extended abstract). In PODC, pp. 51-59, 1991.

Abrham Waksman. A permutation network. J. ACM, 15(1):159-163, 1968.

Zuzana Beerliove-Trubiniova and Martin Hirt. Efficient multi-party computation with dispute control. In TCC, pp. 305-328, 2006.

Ivan Damg_ard and Jesper Buus Nielsen. Scalable and unconditionaity secure multiparty computation. In CRYPTO, pp. 572-590, 2007.

Amir Herzberg, Stanislaw Jarecki, Hugo Krawczyk, and Moti Yung. Proactive secret sharing or: How to cope with perpetual leakage. In CRYPTO, pp. 339-352, 1995.

Rafail Ostrovsky and Moti Yung. How to withstand mobile virus attacks. In In Proceedings of the tenth annual ACM symposium on Principles of distributed computing, pp. 51-59. ACM Press, 1991.

Torben P. Pedersen. Non-interactive and information-theoretic secure verifiable secret sharing. In Joan Feigenbaum, editor, CRYPTO, vol. 576 of Lecture Notes in Computer Science, pp. 129-140. Springer, 1991.

David Schultz. Mobile Proactive Secret Sharing PhD Thesis, Massachusetts Institute of Technology. 2007.

Adi Shamir. How to share a secret. Commun. ACM, 22(11):612-613. 1979.

Alfred V. Aho, John E. Hoperoft, and J. D. Ullman. The Design and Analysis of Computer Algorithms. Addison-Wesley, pp. 299-300, 1974.

Elwyn R. Berlekamp. Algebraic Coding Theory. Aegean Park Press, Chapter 7, 1984.

Michael Ben-Or, Shan Goldwasser, and Avi Wigderson. Completeness theorems for non-cryptographic fault-tolerant distributed computation (extended abstract). In STOC, pp. 1-10, 1988.

Gabriel Bracha. An O(log n) expected rounds randomized byzantine generals protocol, J. ACM, 34(4):910-920, 1987.

Zuzana Beerliova-Trubiniova and Martin Hirt. Perfectly-secure mpc with linear communication complexity. InTCC, pp. 213-230, 2008.

Christian Cachin, Klaus Kursawe, Anna Lysyanskaya, and Reto Strobl. Asynchronous verifiable secret sharing and proactive cryptosysterns. In ACM Conference on Computer and Communications Security, pp. 88-97, 2002.

Ivan Damgard, Yuval Ishai, Mikkel Kroigaard, Jesper Buus Nielsen, and Adam Smith. Scalable multiparty computation with nearly optimal work and resilience. In CRYPTO, pp. 241-261, 2008.

Ivan Damgard, Yuval Ishai, and Mikkel Krotgaard. Perfectly secure multiparty computation and the computational overhead of cryptography. In EUROCRYPT, pp. 445-465, 2010.

Yvo Desmedt and Sushil Jajodia. Redistributing secret shares to new access structures and its applications. Jul. 1997. Technical Report ISSE TR-97-01, George Mason University.

Ivan Damgard and Jesper Buus Nielsen. Scalable and unconditionally secure multiparty computation. In CRYPTO, pp. 572-590, 2007.

Michael J. Fischer and Naancy A. Lynch. A lower bound for the time to assure interactive consistency. Inf. Process. Lett., 14(4):183-186, 1982.

Matthew K. Franklin and Moti Yung. Communication complexity of secure computation (extended abstract). In STOC, pp. 699-710, 1992.

Shuhong Gao. A new algorithm for decoding reed-solomon codes. In Communications, Information and Network Security, Editors V.Bhargava, H.V.Poor, V. Tarokh, and S.Yoon, pp. 55-68. Kluwer, 2002.

Juan A. Garay and Yoram Moses. Fully polynomial byzantine agreement in t+1 rounds. In STOC, pp. 31-41, 1993.

Oded Goldreich. Foundations of Cryptography: vol. 2, Basic Applications. Cambridge University Press, Chapter 7, 2009.

Amir Herzberg, Stanislaw Jarecki, Hugo Krawczytt, and Moti Yung. Proactive secret sharing or: How to cope with perpetual leakage. In CRYPTO, pp. 339-352, 1995.

David Schultz. Mobile Proactive Secret Sharing, PhD thesis, Massachusetts Institute of Technology, 2007.

Theodore M. Wong, Chenxi Wang, and Jeannette M. Wing. Verifiable secret redistribution for archive system. In IEEE Security in Storage Workshop, pp. 94-106, 2002.

Lidong Zhou, Fred B. Schneider, and Robbed van Renesse. Apss: proactive secret sharing in asynchronous systems. ACM Trans. Inf. Syst, Secur., 8(3):259-286, 2005.

Office Action 1 for U.S. Appl. No. 14/207,483, Date mailed: May 22, 2015.

Harn Lein, and Changlu Lin, "Strong (n, t, n) verifiable secret sharing scheme," Information Sciences 180.16 (2010), pp. 3059-3064.

Bai, Li, and XuKai Zou, "A proactive secret sharing scheme in matrix projection method," International Journal of Security and Networks 4.4 (2009), pp. 201-209.

Office Action 1 Response for U.S. Appl. No. 14/207,483, Date mailed: Sep. 22, 2015.

Office Action 2 for U.S. Appl. No. 14/207,483, Date mailed: Nov. 2, 2015.

Office Action 2 Response for U.S. Appl. No. 14/207,483, Date mailed: Apr. 4, 2016.

Office Action 1 for U.S. Appl. No. 14/449,115, Date mailed: Jul. 23, 2015.

(56) References Cited

OTHER PUBLICATIONS

Office Action 1 Respons for U.S. Appl. No. 14/449,115, Date mailed: Oct. 23, 2015.
Office Action 2 for U.S. Appl. No. 14/449,115, Date mailed: Nov. 5, 2015.
Office Action 2 Response for U.S. Appl. No. 14/449,115, Date mailed: Feb. 5, 2016.
Office Action 3 for U.S. Appl. No. 14/449,115, Date mailed: Mar. 7, 2016.
Office Action 3 for U.S. Appl. No. 14/207,483, Date mailed: May 2, 2016.
Damgard, Ivan, and Jesper Buus Nielsen, "Scalable and unconditionally secure multiparty computation,'" Advances in Cryptology—CRYPTO 2007, Springer Berlin Heidelberg 2007, pp. 572-590.
Response to Office Action 3 for U.S. Appl. No. 14/449,115, Date mailed: Jun. 7, 2016.

* cited by examiner

INFORMATION SECURE PROACTIVE MULTIPARTY COMPUTATION (PMPC) PROTOCOL WITH LINEAR BANDWIDTH COMPLEXITY

CROSS-REFERENCE TO RELATED APPLICATIONS

This is a Continuation-in-Part application of U.S. Non-Provisional Application No. 14/207,483, filed in the United States on Mar. 12, 2014, entitled, "System and Method for Mobile Proactive Secure Multi-Party Computation (MPMPC) Using Commitments," which is a Non-Provisional patent application of U.S. Provisional Application No. 61/780,757, filed in the United States on Mar. 13, 2013, entitled, "An Efficient Protocol for Mobile Proactive Secure Multiparty Computation (MPMPC) Using Commitments."

This is ALSO a Non-Provisional patent application of U.S. Provisional Application No. 61/861,334, filed in the United States on Aug. 1, 2013, entitled, "An Information Theoretically Secure Proactive Multiparty Computation (PMPC) Protocol with Linear Bandwidth Complexity."

This is ALSO a Non-Provisional patent application of U.S. Provisional Application No. 61/861,325, filed in the United States on Aug. 1, 2013, entitled, "An Information Theoretically Secure Protocol for Mobile Proactive Secret Sharing with Near-Optimal Resilience."

FIELD OF INVENTION

The present invention relates to a security system and, more particularly, to a security system that employs a secure proactive multiparty computation protocol.

BACKGROUND OF THE INVENTION

Multiparty computation (MPC) allows a group of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol.

Although there are numerous published MPC protocols, few of the published protocols are proactively secure, in what would be considered a proactive MPC (PMPC). A previous work on a proactive MPC is the work of Rafail Ostrovsky and Moti Yung in "How to withstand mobile virus attacks," In Proceedings of the Tenth Annual ACM Symposium on Principles of Distributed Computing, pages 51-59. ACM Press, 1991 (see the List of Incorporated Cited Literature References, Literature Reference No. 18), which is hereby incorporated by reference as though fully set forth herein. A limitation of that protocol is that it is not explicit, in that it does not provide the details of each step to perform and required computations and communication (i.e., the paper only provides a high level argument and description of why it is possible to construct such a protocol). The protocol of Ostrovsky and Yung (see Literature Reference No. 18) is also inefficient. The efficiency is not explicitly stated, but it is at least $\Omega(DCn^3)$ (where D is the circuit depth, C is the number of gates in the circuit and n is the number of servers).

Thus, a continuing need exists for an efficient protocol for proactive security multiparty computation.

SUMMARY OF THE INVENTION

The present invention relates to a security system and, more particularly, to a security system that employs a secure proactive multiparty computation protocol. The system comprises one or more processors and a memory having instructions such that when the instructions are executed, the one or more processors perform multiple operations. The system securely evaluates a circuit in the presence of an adversary, wherein the circuit receives inputs of secret values from a set of servers. The circuit is divided into a plurality of layers, and the circuit comprises input gates, random gates, addition gates, multiplication gates, and output gates; wherein the circuit is securely evaluated as follows:

i. initializing a RobustShare protocol to allow each server in the set of servers to distribute their inputs of secret values among other servers in the set of servers;

ii. initializing a RanDouSha protocol to generate random sharings of the secret values for each random gate in the circuit;

iii. initializing a Block-Redistribute protocol to redistribute the secret values amount the set of servers;

iii. for each layer of the circuit, performing a permutation of the secret values;

iv. evaluating each layer of the circuit;

v. initializing the Block-Redistribute protocol to re-randomize the secret values such that privacy of the secret values is preserved;

vi. determining a sharing of the secret values for each output gate; and vii. initializing a Reco protocol to reveal each sharing of secret values to an intended recipient.

In another aspect, the system transforms the circuit such that all addition gates and multiplication gates have only two inputs and either one or two outputs.

In another aspect, the permutation of the secret values is decomposed into a set of sub-permutations, then each of the sub-permutations in the set of sub-permutations is performed in succession.

In another aspect, the adversary may only corrupt a fixed fraction of servers in the set of servers at a given time.

In another aspect, the system provides perfect security, such that a probability of the adversary compromising the security of the evaluation of the circuit is zero.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
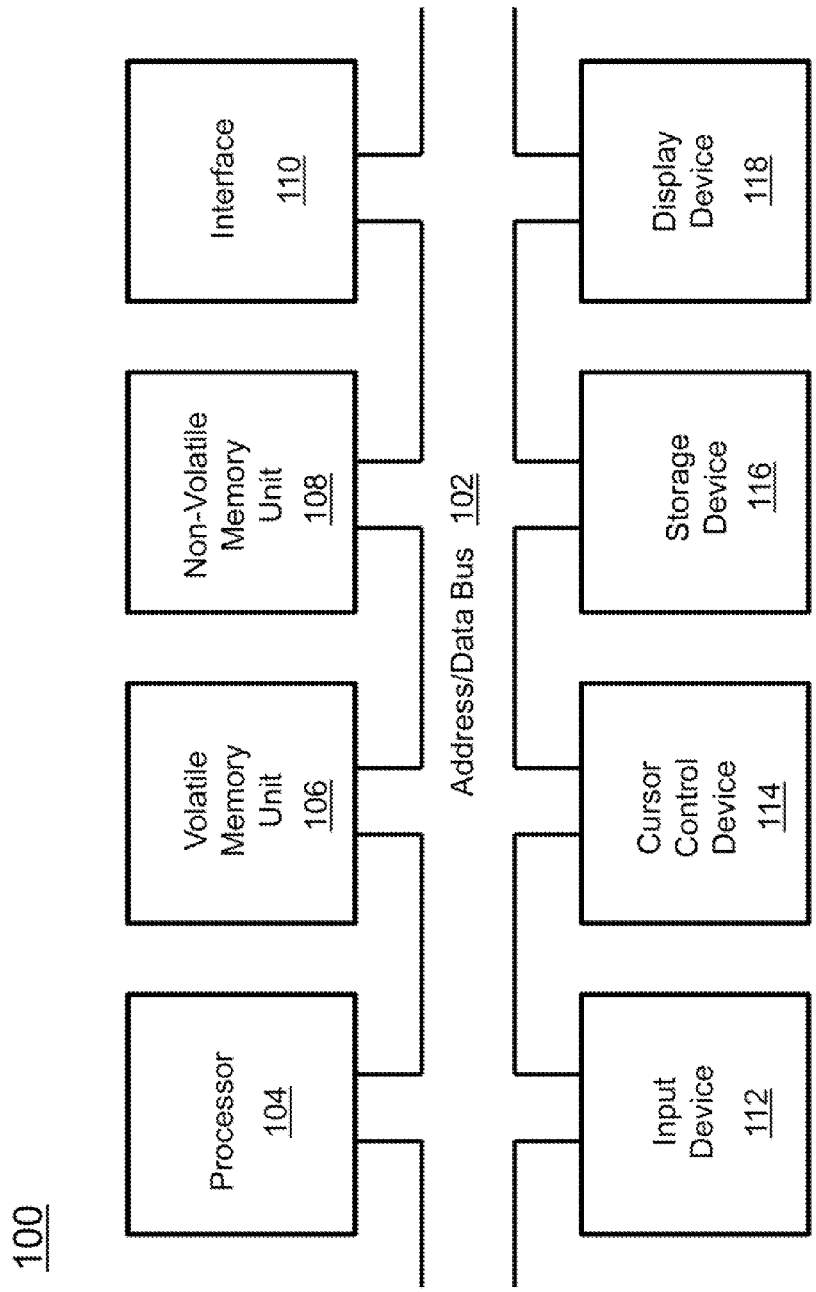
FIG. 1 is a block diagram depicting the components of a system for proactive secret sharing according to the principles of the present invention.

The present invention relates to a security system and, more particularly, to a security system that employs a secure proactive multiparty computation protocol. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Alfred V. Aho, John E. Hopcroft, and J. D. Ullman. The Design and Analysis of Computer Algorithms, Addison-Wesley, pages 299-300, 1974.
2. Vaclav E. Benes. Optimal rearrangeable multistage connecting networks. The Bell System Technical Journal, 43(4):1641-1656, July, 1964.
3. Elwyn R. Berlekamp. Algebraic Coding Theory. Aegean Park Press, 1984.
4. Michael Ben-Or, Shafi Goldwasser, and Avi Wigderson. Completeness theorems for non-cryptographic fault-tolerant distributed computation (extended abstract). In STOC, pages 1-10, 1988.
5. Gabriel Bracha. An O(log n) expected rounds randomized byzantine generals protocol. J. ACM, 34(4):910-920, 1987.
6. Eli Ben-Sasson, Serge Fehr, and Rafail Ostrosvsky. Near-linear unconditionally-secure multiparty computation with a dishonest minority. Cryprology ePrint Archive, Report 2011/629, 2011.
7. Zuzana Beerliova-Trubiniova and Martin Hirt. Efficient multi-party computation with dispute control. In TCC, pages 305-328, 2006.
8. Zuzana Beerliova-Trubiniova and Martin Hirt. Perfectly-secure mpc with linear communication complexity. In TCC, pages 213-230, 2008.
9. Ivan Damgard, Yuval Ishai, Mikkel Kroigaard, Jesper Buus Nielsen, and Adam Smith. Scalable multiparty computation with nearly optimal work and resilience. In CRYPTO, pages 241-261, 2008.
10. Ivan Damgard, Yuval Ishai, and Mikkel Kroigaard. Perfectly secure multiparty computation and the computational overhead of cryptography. In EUROCRYPT, pages 445-465, 2010.
11. Ivan Damgard and Jesper Buus Nielsen. Scalable and unconditionally secure multiparty computation. In CRYPTO, pages 572-590, 2007.
12. Michael J. Fischer and Nancy A. Lynch. A lower bound for the time to assure interactive consistency. Inf. Process. Lett., 14(4):183-186, 1982.
13. Matthew K. Franklin and Moti Yung. Communication complexity of secure computation (extended abstract). In STOC, pages 699-710, 1992.
14. Shuhong Gao. A new algorithm for decoding reed-solomon codes. In Communications, Information and Network Security, Editors V. Bhargava, H. V. Poor, V. Tarokh, and S. Yoon, pages 55-68. Kluwer, 2002.
15. Craig Gentry, Shai Halevi, and Nigel P. Smart. Fully homomorphic encryption with poly log overhead. In EURO-CRYPT, pages 465-482, 2012.
16. Juan A. Garay and Yoram Moses. Fully polynomial byzantine agreement in t+1 rounds. In STOC, pages 31-41, 1993.
17. Frank Thomson Leighton. Introduction to parallel algorithms and architectures: arrays, trees, hypercubes. Morgan Kaufmann, 1992.
18. Rafail Ostrovsky and Moti Yung. How to withstand mobile virus attacks (extended abstract). In PODC, pages 51-59, 1991.
19. Abraham Waksman. A permutation network. J. ACM, 15(1):159-163, 1968.

(2) Principal Aspects

The present invention has three "principal" aspects. The first is a secure proactive multiparty computation (PMPC) protocol. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as at magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
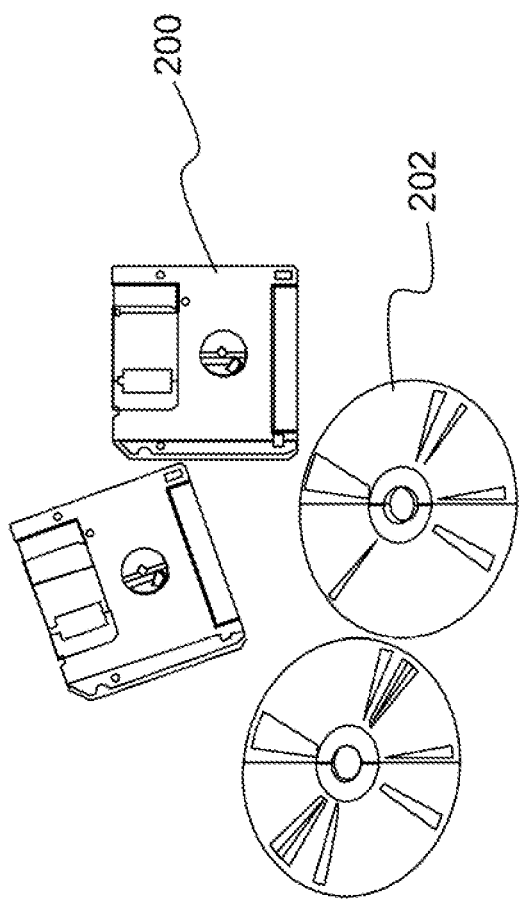
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Multiparty computation (MPC) allows a set of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol. When a circuit is said to be evaluated "securely," it means that the adversary does not learn anything about the inputs of the uncorrupted servers, except what can be deduced from the output of the circuit (which is known to all servers), and that the output of the circuit is correct.

Proactive MPC (or PMPC) is an MPC protocol which still evaluates the circuit securely when the adversary is allowed to corrupt any number of servers, so long as no more than a fixed portion of the servers are corrupt at any given time. Servers are periodically refreshed, and as long as the adversary did not compromise a number of servers larger than the threshold between two consecutive refreshes, the computation is guaranteed to be secure.

Consider a set of players $\mathcal{P}$ which are to securely compute an arithmetic circuit Circ over some finite field $\mathbb{F}$. All the stored secrets are periodically redistributed throughout the protocol. The period between adjacent redistributions is called a stage. Additionally, the period before the first redistribution is a stage, and the period after the last redistribution is a stage.

Let n denote the number of players and write $$\mathcal{P} = \{P_i\}_{i=1}^n.$$

Let t denote the threshold of corruption (i.e., the maximum number of players the adversary may corrupt during the current stage). An active adversary that may adaptively corrupt and de-corrupt players at will, so long as the number of corruptions per stage does not exceed the threshold, is assumed. Any player that is corrupt during a secret redistribution is considered to be corrupt in both adjacent stages. It is required that $t < n/8$ at each stage. Let Corr denote the set of players believed to be (possibly) corrupt. Throughout the protocol, whenever one player accuses another of bad behavior, both players will be added to Corr. Initially, Corr=$\emptyset$ is assumed. Further, a synchronous network model with secure point-to-point channels and a secure, authenticated broadcast channel is assumed.

The PMPC protocol according to the principles of the present invention shares secrets in blocks (as described in Literature Reference No. 13). The secrets are stored in blocks of size l, where l is the highest power of 2 not greater than n/4. They are stored as follows: Fix some generator $\zeta$ of $\mathbb{F}^*$. Each block of l secrets is stored in a polynomial H of degree$\leq d=l+t-1$. The polynomial H is chosen such that $H(\zeta^{-j})$ is the $j^{th}$ secret for $j=1, \ldots, l$ and $H(\zeta^{-l-j})$ is uniformly random for $j=1, \ldots, t$.

The PMPC protocol according to the principles of the present invention requires the use of hyper-invertible matrices (see Literature Reference No. 8 for a description of hyper-invertible matrices). A hyper-invertible matrix is such that any square sub-matrix formed by removing rows and/or columns is invertible. It is shown in Literature Reference No. 8 that one can construct an a×b hyper-invertible matrix M as follows: Pick a+b distinct field elements $\theta_1, \ldots, \theta_a$, $\Phi_1, \ldots, \Phi_b \in \mathbb{F}$ and let M be the matrix such that if $(y_1, \ldots, y_a)^T = M(x_1, \ldots, x_b)^T$, then the points $(\theta_1, y_1), \ldots, (\theta_a, y_a)$ lie on the polynomial of degree$\leq b-1$ which evaluates to $x_j$ at $\Phi_j$ for each $j=1, \ldots, b$. In other words, M interpolates the points with x-coordinates $\theta_1, \ldots, \theta_a$ on a polynomial given the points with x-coordinates $\Phi_1, \ldots, \Phi_b$ on that polynomial. Many of the sub-protocols assume the existence of a publicly known hyper-invertible matrix, and these may be efficiently constructed during pre-processing.

Provided below is a table illustrating symbols as used in the protocol according to the principles of the present invention.

| | Table of Symbols Used in Protocol Description |
|---|---|
| $\mathcal{P}$ | The set of servers on-line and engaged in the protocol in the current stage. |
| n | The number of servers engaged in the protocols in the current stage. |
| t | The maximum number of servers that a malicious party can corrupt without compromising security. This is called the threshold of corruption. |
| d | The (maximal) degree of the polynomials used to share the secrets. |
| Corr | A publicly known set of servers which are possibly corrupt. |
| $P_i$ | The server with index i in $\mathcal{P}$. |
| $\alpha_i$ | The evaluation point of server of $P_i$. This determines which share of the secret $P_i$ will get. |

(4) Specific Details of the Invention

Described below is an overview of the PMPC protocol according to the principles of the present invention. Several sub-protocols are used in this description. These sub-protocols are briefly described in the table below.

| Descriptions of Sub-Protocols | |
|---|---|
| Sub-Protocol Name | Description of Achieved Functionality |
| RobustShare | Allows players/parties to share blocks of secrets. |
| RanDouSha | Generates random sharings of blocks of secrets. |
| Reco | Reveals a block of secrets to a server. |
| RandomPairs | Generates pairs of random permuted block-sharings. |
| PermuteWithinBlocks | Using random masks generated with RandomPairs, this protocol applies a permutation to a block of already-shared secrets. |
| Multiply | Multiplies two blocks of secrets. |
| Block-Redistribute | Redistributes a shared secret so that the new shares are completely random relative to the old ones. |
| PermuteBetweenBlocks | Applies a sub-permutation to a group of blocks of secrets that only requires permuting between blocks |
| PermuteLayer | Applies a permutation to a group or "layer" of blocks of secrets via decomposing the permutation into sub-permutations. |
| Committee-BW | After the protocol is altered using server virtualization, |

| Descriptions of Sub-Protocols | |
|---|---|
| Sub-Protocol Name | Description of Achieved Functionality |
| | this protocol allows a committee to perform the Berlekamp-Welch algorithm in a constant number of rounds. |

Figure 3:
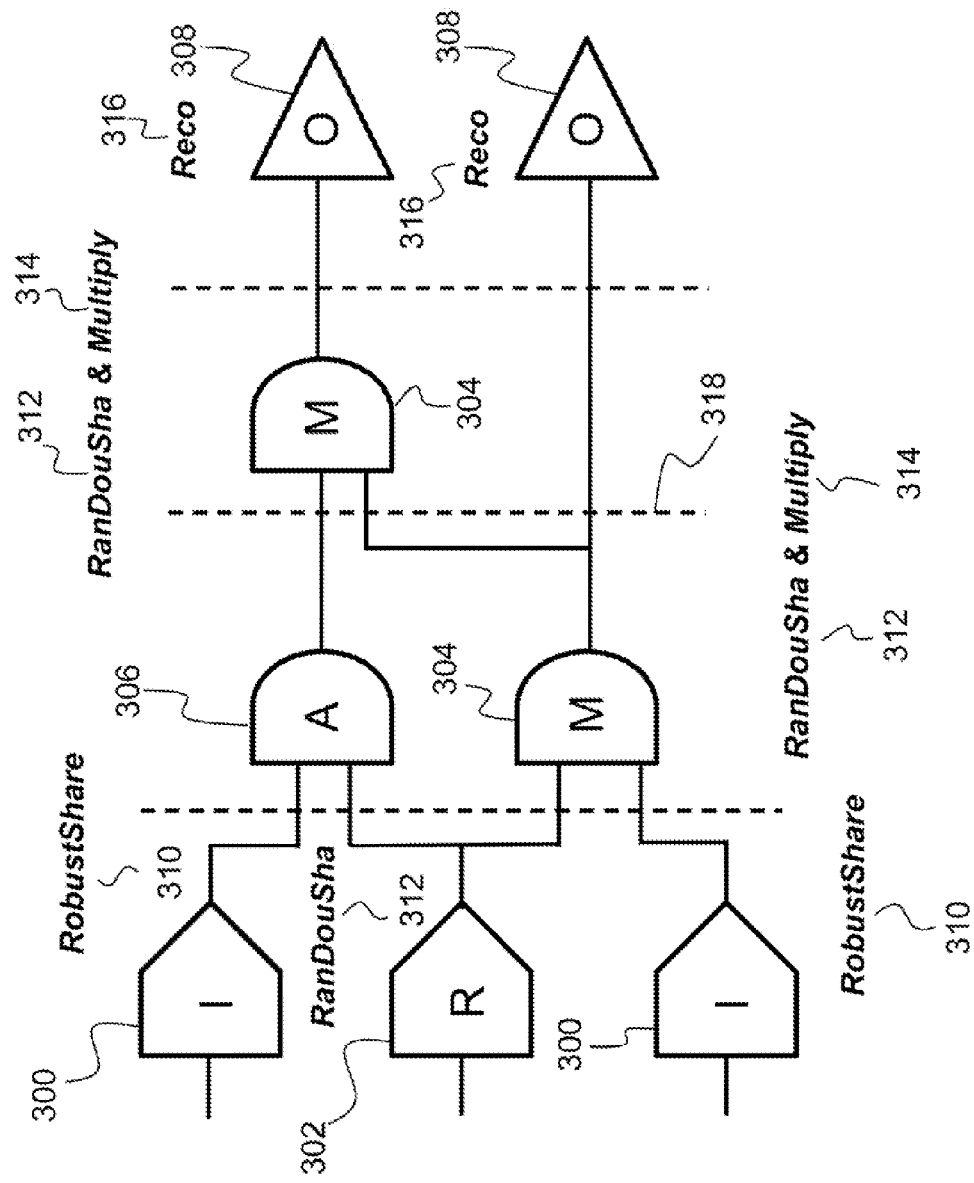
FIG. 3 illustrates an example of an arithmetic circuit.

The PMPC protocol proceeds as follows. First, the circuit is transformed so that all addition gates (FIG. 3, element 306) and multiplication gates (FIG. 3, element 304) have only two inputs and either one or two outputs. Sharings of values for input gates (FIG. 3, element 300) are shared by their respective players/parties using a RobustShare protocol (FIG. 3, element 310). Then, sharings of random values for random gates (FIG. 3, element 302) are generated using a RanDouSha protocol (FIG. 3, element 312). After this initial setup has been done, the servers compute the circuit layer-by-layer.

FIG. 3 illustrates a circuit divided into layers, comprising input (I) gates 300, random (R) gates 302, multiplication (M) gates 304, addition (A) gates 306, and output (O) gates 308. Random gates 302 are gates that require generation of a random number that are used in the computation (i.e., added to or multiplied to other inputs). The protocols used in helping evaluate each gate are labeled next to the gates, including the RobustShare protocol 310, the RanDouSha protocol 312, the Multiply protocol 314, and the Reco protocol 316. Addition gates 306 can be evaluated via local additions without running an explicit protocol. The circuit is divided into layers as designated by dashed lines 318. Before each layer of the circuit is computed, the secrets are permuted (or re-arranged) to facilitate the process of computation. This is done by decomposing the permutation to be performed into sub-permutations (depicted as element 406 in FIG. 4) and then performing each of the sub-permutations in succession.

When the permutations are complete, addition gates 306 are evaluated, via locally adding shares. Multiplication gates 304 are evaluated by creating pairs of random sharings using the RanDouSha protocol 312, and then using these sharings to invoke the Multiply protocol 314. After each layer of the circuit is evaluated, the servers run the Block-Redistribute protocol (depicted as element 404 in FIG. 4) to re-randomize all stored secrets, thereby preserving privacy of the stored values. Once a sharing for an output gate 308 has been computed, the servers invoke the Reco protocol 316 to reveal it to the intended recipient. Once all the outputs have been revealed, the protocol is complete.

Figure 4:
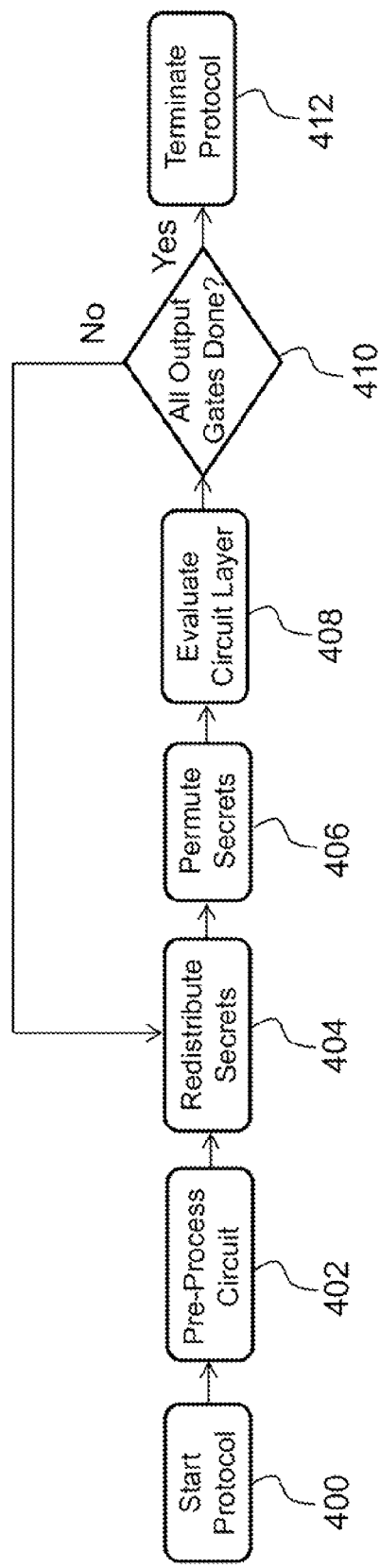
FIG. 4 is flowchart depicting a process according to the principles of the present invention.

FIG. 4 illustrates a flow chart for the protocol according to the principles of the present invention. In a first step 400, the protocol starts. In a second step 402, the circuit is pre-processed. Next, in a third step 404 of the process, secrets are redistributed. In a fourth step 406, secrets are permuted. Then, in a fifth step 408, the circuit layer is evaluated. In a sixth step 410, the system determines if all output gates have been computed. If not, the process returns to the third step 404 to re-randomize all the stored secrets. If all output gates are done, then the protocol is terminated in a seventh step 412. Each of the steps will be described in further detail below..

(4.1) Basic Protocols

One algorithm which is used repeatedly in the redistribution protocol is the Berlekamp-Welch algorithm (see Literature Reference No. 3 for a description of the Berlekamp-Welch algorithm), depicted as elements 404 and 408 in FIG. 4. If a server is given points on a polynomial (such as shares of a block of secrets) and some of the points have been corrupted (such as when corrupt servers alter their shares), the Berlekamp-Welch algorithm allows the server to correctly interpolate the polynomial despite the corrupted points. The basic outline of the algorithm is as follows: Suppose the server wants to interpolate a polynomial P. The server receives a vector of shares $(y_1, \ldots, y_n)$ (represented by elements 404 and 408 in FIG. 4) where each honest $P_i$ sent $y_i = P(\alpha_i)$ (although there are some i such that $y_i \neq P(\alpha_i)$) for the polynomial P that the server is trying to interpolate. Denote the set of all i such that $y_i \neq P(\alpha_i)$ by I. Define a polynomial $E(x) = \Pi_{i \in I}(x - \alpha_i)$, and define another polynomial $N = P \cdot E$. Note that the relation $N(\alpha_i) = y_i E(\alpha_i)$ holds for all $i = 1, \ldots, n$. These n relations are used to construct a matrix equation for the coefficients of N and E. The server solves this equation and then computes P by dividing N by E.

To perform basic tasks such as secret sharing, generating random sharings, and multiplying shared secrets, three protocols are used from Literature Reference No. 9 (the RobustShare protocol 310, the RanDouSha protocol 312, and the Reco protocol 316) and three from Literature Reference No. 10 (the RandomPairs protocol, the PermuteWithinBlocks protocol, and the Multiply protocol 314). For each of these protocols, the computational complexity is the communication complexity times a $\log^3 n$ factor. Each of these protocols is proved to be secure in their respective papers.

RobustShare (element 310): Communication complexity of sharing W secrets is $O(W+n^3)$.

RanDouSha (element 312): Communication complexity of generating W secrets is $O(W+n^3)$.

Reco (element 316): Communication complexity of revealing W secrets is $O(W)$.

RandomPairs: For a permutation $\pi$ of l elements, this protocol generates pairs of random block-sharings ([r], [$\pi(r)$]). Communication complexity of generating W random pairs is $O(W+n^3)$.

PermuteWithinBlocks: Communication complexity for permuting W secrets is $O(W+n^3)$.

Multiply (element 314): Communication complexity for multiplying W secrets is $O(W+n^3)$.

(4.2) Redistribution

Described below is the Block-Redistribute protocol for redistributing W secrets that are block-shared among a server set $\mathcal{P}$ of size n to a new set of servers $\mathcal{P}'$ of size n'. For simplicity of notation, the protocol assumes that W is a multiple of $l^2(n-3t)$. If W is not a multiple of $l^2(n-3t)$, one can generate random sharings of blocks to make it so. Using RanDouSha (FIG. 3, element 312) from Literature Reference No. 9, this can be done with poly(n) communication complexity, and since it adds only a poly(n) amount of data to W, this does not affect the overall communication complexity of redistributing W secrets.

Since the number of secrets is a multiple of $l^2(n-3t)$, and since the secrets are stored in blocks of size l, the number of polynomials/sharings input to the protocol is a multiple of $l(n-3t)$. The polynomials are arranged in groups of size l, and then these groups are arranged into "towers," where each tower contains n−3t groups. The total number of towers is denoted by B, so that $W = l^2(n-3t)B$. This means that the number of input polynomials is $l(n-3t)B$. These polynomials are indexed as $$\{H_a^{(k,m)}\} \begin{array}{l} m = 1, \ldots, B \\ k = 1, \ldots, n-3t, \\ a = 1, \ldots, \ell \end{array}$$

where a indicates $H_a^{(k,m)}$'s location in the group, k indicates $H_a^{(k,m)}$'s group number within the tower, and m indicates $H_a^{(k,m)}$'s tower number.

For the protocol described herein, let M be some (publicly known) hyper-invertible matrix with n rows and n−2t columns. Throughout the protocol, the Berlekamp-Welch algorithm is used to interpolate polynomials in the presence of corrupt shares introduced by the adversary. As was noted in Literature Reference No. 11, if M is as above and y=Mx, then one can also use Berlekamp-Welch to interpolate x from y if the adversary corrupts no more than t coordinates of y.

The protocol requires a slightly altered version of RanDouSha (FIG. 3, element 312) for step 2.1. in Literature Reference No. 9, RanDouSha (element 312) calls on a sub-protocol SemiRobustShare, and in that protocol, step 2(a) is altered so that the servers check that the polynomials evaluate to zero at $\zeta^j$ for j=1, . . . , l, and an accusation is broadcast if they do not. The security proof for this altered protocol is exactly the same as in Literature Reference No. 9.

(4.2.1) Block-Redistribute $$\{\hat{H}_a^{(k,m)}\} \begin{array}{l} m = 1, \ldots, B \\ k = 1, \ldots, n-3t, \\ a = 1, \ldots, \ell \end{array}$$

It is assumed that the secrets have been stored in blocks of size l (as described above) in polynomials $\hat{H}_a^{(k,m)}$. The Block-Redistribute protocol is represented by element 404 in FIG. 4.

(1) Double Sharing Block-Shared Secrets
  (1.1) The players in $\mathcal{P}$ invoke RanDouSha (FIG. 3, element 312) to generate masking polynomials $Q_a^{(k,m)}$ for each a, k, and m satisfying $Q_a^{(k,m)}(\zeta^{-j})=0$ for j=1, . . . , l.
  (1.2) The players locally add the shares of the masking polynomials to the shares of their block-shared secrets. Let $H_a^{(k,m)} \leftarrow \hat{H}_a^{(k,m)} + Q_a^{(k,m)}$ denote these re-randomized sharings.
  (1.3) All players erase their shares of each $\hat{H}_a^{(k,m)}$ and $Q_a^{(k,m)}$.
  (1.4) The players use RanDouSha (element 312) to generate additional random polynomials $H_a^{(k,m)}$ where a and m range over the same values as before, but k=n−3t+1, . . . , n−2t.
  (1.5) Each player block-shares all of his shares of each $H_a^{(k,m)}$ using RobustShare (element 310). That is, $P_i$ chooses polynomials $U^{(i,1,m)}, \ldots, U^{(i,(n-2t),m)}$ of degree≤d such that $U^{(i,k,m)}(\zeta^{-a})=H_a^{(k,m)}(\alpha_i)$ for a=1, . . . , l, k=1, . . . , n−2t, and m=1, . . . , B and shares them via RobustShare (element 310).

(2) Verifying Correctness
  (2.1) Define $\tilde{H}_a^{(\tilde{k},m)}$ and $\tilde{U}^{(i,\tilde{k},m)}$ for $\tilde{k}$=1, . . . , n by $(\tilde{H}_a^{(1,m)}, \ldots, \tilde{H}_a^{(n,m)})^T = M(H_a^{(1,m)}, \ldots, H_a^{(n-2t,m)})^T$ and $(\tilde{U}^{(i,1,m)}, \ldots, \tilde{U}^{(i,n,m)})^T = M(U^{(i,1,m)}, \ldots, U^{(i,n-2t,m)})^T$. Each player in $\mathcal{P}$ locally computes their shares of these polynomials.
  (2.2) Each player in $\mathcal{P}$ sends all their shares of $\tilde{H}_a^{(\tilde{k},m)}$ and $\tilde{U}^{(i,\tilde{k},m)}$ to player $P_{\tilde{k}}$ for each a, i, and m.
  (2.3) Each $P_{\tilde{k}}$ uses Berlekamp-Welch on the shares of each $\tilde{U}^{(i,\tilde{k},m)}$ to interpolate $\tilde{U}^{(i,\tilde{k},m)}(\zeta^{-a})$ for each a=1, . . . , l.
  (2.4) Each $P_{\tilde{k}}$ uses Berlekamp-Welch on the shares of each $\tilde{H}_a^{(\tilde{k},m)}$ to interpolate $\tilde{H}_a^{(\tilde{k},m)}(\alpha_i)$ for each i=1, . . . , n.
  (2.5) Each $P_{\tilde{k}}$ checks if the shares of $\tilde{H}_a^{(\tilde{k},m)}$ are consistent with the interpolation of the polynomial $\tilde{U}^{(i,\tilde{k},m)}$. That is, $P_{\tilde{k}}$ checks if $\tilde{U}^{(i,\tilde{k},m)}(\zeta^{-a})=\tilde{H}_a^{(\tilde{k},m)}(\alpha_i)$ for each a=1, . . . , l. If some $\tilde{U}^{(i,\tilde{k},m)}$ does not pass this check, then $P_{\tilde{k}}$ broadcasts ($P_{\tilde{k}}$, J'accuse, $P_i$). Whenever a player receives an accusation, both the accuser and the accused are added to Corr. (After a player is added to Coor, any further accusations from that player are ignored.)
  (2.6) Each server erases all their shares of each $\tilde{H}_a^{(k,m)}$ and $\tilde{U}^{(i,\tilde{k},m)}$ for $\tilde{k}$=1, . . . , n and $H_a^{(k,m)}$ and $U^{(i,k,m)}$ for k=n−3t+1, . . . , n−2t.

(3) Share Redistribution (FIG. 4, Element 404)
  (3.1) Define G to be the set of the first n−2t servers in $\mathcal{P}$ −Corr. Let $\{z_1, \ldots, z_{n-2t}\}$ denote the set of indices of servers in G. Let $\lambda_{j,i}$ denote the Lagrange coefficients for interpolating $P_j$'s share of a secret from the shares of servers in G (i.e., for a polynomial f of degree≤d, $f(\alpha_j) = \lambda_{j,1} f(\alpha_{z_1}) + \ldots + \lambda_{j,n-2t} f(\alpha_{z_{n-2t}})$.)
  (3.2) For each k=1, . . . , n−3t, each m=1, . . . , B and each j=1, . . . , n, each player in G sends his share of $\lambda_{j,2} U^{(z_1,k,m)} + \ldots + \lambda_{j,n-2t} U^{(z_{n-2t},k,m)}$ to $P_j$.
  (3.3) Each $P_j$ uses Berlekamp-Welch to interpolate the polynomials received in the previous step. Note that fir each a=1, . . . , l, $\lambda_{j,1} U^{(z_1,k,m)}(\zeta^{-a}) + \ldots + \lambda_{j,n-2t} U^{(z_{n-2t},k,m)}(\zeta^{-a}) =$
  $\lambda_{j,1} H_a^{(k,m)}(\alpha_{z_1}) + \ldots + \lambda_{j,n-2t} H_a^{(k,m)}(\alpha_{z_{n-2t}}) =$
  $H_a^{(k,m)}(\alpha_j)$.

Thus, $P_j$ has his share of each block of data.
  (3.4) Each player erases all their shares of each $U^{(i,k,m)}$ (retaining the shares of $H_a^{(k,m)}$).
  (3.5) Set Corr=∅.

The protocol Block-Redistribute has communication complexity $O(W+n^3)$. The computational complexity is the communication complexity times a $\log^3 n$ factor.

(4.3) Permutations (Depicted as Element 406 in FIG. 4)

At each layer of the circuit, the computations will be performed in blocks. If, for instance, multiplication is to be performed, then two polynomials f and g, each storing l secrets, will be multiplied together. In particular, the secret stored at location $\Theta^{-j}$ in f will be multiplied by the secret stored in the same location in g. This presents a problem if one wants to multiply secrets from two different locations in f and g, or if one wants to multiply two secrets that are both stored in f. To remedy this, at each layer of computation of the circuit a permutation will be performed on all of the secrets to make sure that the secrets are arranged in the correct order for whatever arithmetic operations that layer requires. One circuit layer is computed in one layer of computation.

In order to perform the permutations, Benes networks (see Literature Reference No. 2), also known as Waksman networks (see Literature Reference No. 19), are used. These networks were used in the context of multiparty computation in Literature Reference No. 10, and also in the context of fully homomorphic encryption in Literature Reference No. 15. Benes networks are implicitly used in the same way as Literature Reference No. 10 and Literature Reference No. 15.

The following lemma captures the behavior of Benes networks. The proof can be found in any computer science text that deals with Benes networks (such as Literature Reference No. 17). A more general version of this lemma can be found in Literature Reference No. 15.

(4.3.1) Lemma 9.1

Suppose one is given a permutation $\sigma$ on L elements, where L is a power of 2, and that each element is given an index for its location represented as a binary integer of length log L (where the elements are indexed 0 through L−1). Then $\sigma$ can be decomposed into $\sigma = \pi_1 \circ \pi_2 \circ \ldots \circ \pi_{2 \log L - 1}$ such that $\pi_k$ only swaps elements whose index differs in bit k for k≤log L and only swaps elements whose index differs in bit 2 log L−k for k≥log L.

As an example with L=8, consider the permutation $\sigma$=(0 6 5 3 4 2). This can be decomposed into $\sigma = \pi_1 \circ \pi_2 \circ \pi_3 \circ \pi_4 \circ \pi_5$ with $\pi_1$=(2 6)(3 7), $\pi_2$=(4 6), (5 7), $\pi_3$=(6 7), $\pi_4$=(0 2), and $\pi_5$=(3 7). One can see that each permutation satisfies the property stated in the lemma. For instance, if one writes $\pi_1$ in binary, it becomes (010 110), (011 111), and it is clear that each 2-cycle only permutes elements that differ in the first (leftmost) bit. In binary, $\pi_2$=(100 110), (101 111), and it is clear that only elements that differ in the second bit are permuted, etc.

At each layer of the circuit, some permutation $\sigma$ is performed to make sure the secrets are in the correct order. This requires one to assume that the number of secrets is a power of 2, which may require generating extra random secrets, but this does not affect the asymptotic complexity of the protocol. Lemma 9.1 is used to decompose the permutation. Note that because the block size is always a power of 2, each sub-permutation in the decomposition either permutes between blocks such that elements get mapped to the same location in different blocks, or the sub-permutation permutes within blocks. Using the example permutation above, and assuming the block size l=4, then the secrets would be stored in two blocks (a, b, c, d) and (e, f, g, h), where a is in location 0 and h is in location 7. Then $\pi_5$ from above switches d with h; note that each of these indices are in the same location in their respective blocks. The result is (a, b, c, h) and (e, f, g, d). Then $\pi_4$ switches a with c; note that these indices are in the same block.

Therefore, in order to perform an arbitrary permutation $\sigma$ on W secrets, first the permutation is decomposed into sub-permutations, and then each sub-permutation is performed individually. Two different protocols for performing sub-permutations are described below: one for permuting between blocks, and one for permuting within blocks.

For the PermuteBetweenBlocks protocol, assume the secrets are stored in polynomials $\{H_m\}_{m=1, \ldots, A}$, where each polynomial holds l secrets, and both l and A are powers of 2. The sub-permutation being used is referred to as $\pi$. The following notation is needed: For $I \subseteq \{1, \ldots, l\}$, let $f_I$ denote the polynomial of degree≤d satisfying $f_I(\zeta^{-i})=1$ for $i \in I$, $f_I(\zeta^{-i})=0$ for $i \in \bar{I}$, and $f_I(\zeta^{-i})=0$ for i=l+1, . . . l+t. If $\pi$ is a sub-permutation as constructed in Lemma 9.1, then $\pi$ consists of disjoint 2-cycles, and denote by sh($\pi$) the distance between any two elements in one of $\pi$'s 2-cycles (which will be the same for each 2-cycle). Using an example from above, sh($\pi_2$)=sh((4 6)(5 7))=2.

(4.3.1.1) PermuteBetweenBlocks ($\pi$m $\{H_m\}_{m=1, \ldots, A}$) (depicted as element 406 in FIG. 4)

1. invoke RanDouSha (element 312) to generate 2A pairs of random polynomials (r, R), where r is of degree d, R is of degree 2d, and both polynomials share the same block of secrets.

2. The following is done in parallel for each pair of polynomials $(H_m, H_{m+sh(\pi)/l})$ such that m−1 is zero in the log(sh($\pi$))$^{th}$ bit.
    2.1. Define a set $I \subseteq \{1, \ldots, l\}$ as follows: $i \in I$ if and only if the 2-cycle ((m−1)l+(i−1), (m−1)l+(i−1)+sh($\pi$)) is contained in $\pi$.
    2.2. Using the random polynomials generated in step 1, the players invoke the Multiply protocol (element 314) and then perform local additions to compute (and relabel)

$$H_m \leftarrow f_{\bar{I}} \cdot H_m + f_I \cdot H_{m+sh(\pi)/l}$$

$$H_{m+sh(\pi)/l} \leftarrow f_{\bar{I}} \cdot H_{m+sh(\pi)/l} + f_I \cdot H_m.$$

The PermuteBetweenBlocks protocol has communication complexity O(W+poly(n)) for permuting W secrets. It takes 20 rounds of communication, 2 Berlekamp-Welch rounds, and 1 multiplication round.

Described below is a protocol for performing a permutation $\pi$ on a collection of secrets for one layer of the circuit. It is assumed that $\pi$ is a sub-permutation as constructed in Lemma 9.1. Note that if sh($\pi$)<l, then $\pi$ is a permutation within blocks, and if sh($\pi$)≥l, then $\pi$ is a permutation between blocks. The protocol will apply $\pi$ differently depending on whether or not sh($\pi$)<l.

The following notation is needed: If sh($\pi$)<l (i.e., $\pi$ is a permutation within blocks), one can decompose $\pi$ into $\pi_m$, where each $\pi_m$ permutes only the block stored in $H_m$. It is known that $\pi_m$ is a permutation of l consecutive integers, so $\pi^*_m$ may be defined to be $\pi_m$ "shifted" so that it permutes the integers 1 through l. More concretely, if $\pi_m$ is a permutation of the integers x through x+l, then $\pi^*_m$ contains the 2-cycle (q,q+sh($\pi$)) if and only if $\pi_m$ contains the 2-cycle (q+x−1, q+x−1+sh($\pi$)).

(4.3.1.2) Permute Layer ($\pi$, $\{H_m\}_{m=1, \ldots, A}$)

If sh($\pi$)≥l, then invoke the protocol PermuteBetweenBlocks ($\pi$, $\{H_m\}_{m=1, \ldots, A}$). If sh($\pi$)<l, then the following steps are performed for each $H_m$ in parallel.

1. Invoke RanDouSha (element 312) to generate 3A pairs of random polynomials (r, R), where r is of degree d, R is of degree 2d, and both polynomials share the same block of secrets.
2. Define sets $I_m, J_m, K_m \subseteq \{1, \ldots, l\}$ as follows: For each 2-cycle (b, b+sh($\pi$)) contained in $\pi^*_m$, $b \in I_m$ and b+sh($\pi$)$\in J_m$, and $K_m$ is the set of fixed points of $\pi^*_m$.
3. Define $v_I$ to be the permutation of $\{1, \ldots, l\}$ that shifts each integer to the left by sh($\pi$), and define $v_J$ to be the inverse of $v_I$.
4. Invoke the RandomPairs protocol to generate A random pairs of block-sharings (r, $v_I(r)$) and A random pairs (r, $v_J(r)$).
5. Using the random pairs generated in the previous step, invoke the PermuteWithinBlocks protocol to apply $v_I$ to $H_m$, and call the result $H_{m,I}$; similarly construct $H_{m,J}$.
6. Using the random polynomials generated in step 1, the players invoke the Multiply protocol (element 314) and then perform local additions to compute (and relabel)

$$H_m \leftarrow f_{K_m} \cdot H_m + f_{I_m} \cdot H_{m,I} + f_{J_m} \cdot H_{m,J}.$$

The PermuteLayer protocol has communication complexity O(W+poly(n)) for permuting W secrets.

(4.4) The Main Protocol

The following is the protocol that uses all of the sub-protocols described above to securely compute the circuit.

(4.4.1) PMPC (Depicted in FIG. 4)

1. The circuit is transformed so that each layer of computation contains only one type of gate (addition or multiplication), and each gate has fan-in 2 and fan-out 1 or 2, as described in Literature Reference No. 10. (This increases the circuit site by a constant factor, and adds a log $\mathcal{C}$ factor to the depth.)
2. Each player shares their inputs using, the RobustShare protocol (element 310).
3. The players invoke the RanDouSha protocol (element 312) to generate random sharings for each random gate.
4. Invoke the Block-Redistribute protocol to redistribute all of the currently stored secrets.
5. For each layer of the circuit, the following steps are performed.
   5.1 Suppose one has W input values for this layer. Let W' denote the smallest power of 2 greater than W. Let W" denote the smallest multiple of $l^2(n-3t)$ greater than W'. invoke the. RanDouSha protocol (element 312) to generate W"-W' "excess" secrets for padding.
   5.2 Let σ denote the permutation to be performed on the first W" secrets before the computation for this layer, and let $\sigma=\pi_1 \circ \ldots \circ \pi_W$ denote its decomposition as in Lemma 9.1, where ○ represents composition of sub-permutations to yield the sigma permutation.
   5.3 Perform the following for each $\pi_k$ from $\pi_W$ down to $\pi_1$.
      5.3.1 Invoke the PermuteLayer protocol to apply $\pi_k$ to the first W' secrets.
      5.3.2 Invoke the Block-Redistribute protocol to redistribute all W" secrets.
   5.4 If this is an addition layer, then compute the additions locally. If this is a multiplication layer, then the players invoke the RanDouSha protocol (element 312) to generate random sharings, and then use these random sharings to invoke the Multiply protocol (element 314) for each block to multiply. (The random sharings are then discarded.)
   5.5 All excess blocks of secrets generated in step 5.1 are now discarded.
   5.6 Invoke the Block-Redistribute protocol to redistribute all W' secrets.
6. For the output layer, invoke the Reco protocol (element 316) to reconstruct all the outputs toward the intended recipients.

The PMPC protocol has communication complexity O(DC log²C+Dpoly(n)log²C). In the case where the circuit is layered such that the outputs from one layer are used only for gates in the next layer, the communication complexity becomes O(C log²C+Dpoly(n)log²C). The computational complexity is the communication complexity times a log³n factor. The protocol uses O(1) broadcasts per dispute. Since the number of disputes that can arise between secret redistributions is at most t, the total number of broadcasts is 0(Dn).

(4.5) Player Virtualization in a Constant Number of Rounds

The PMPC protocol has a very low threshold of corruption. In order to increase it, player virtualization is used (Literature Reference No. 5). The players in the above protocol are replaced with committees of players so that a smaller fraction of committees are corrupt than the fraction of players that are corrupt. The result of Literature Reference No. 5 is non-constructive in that the committees are chosen randomly; it is shown that with high probability the random choices will lead to a good selection of committees. The technique of Literature Reference No. 5 was made constructive in Literature Reference No. 9.

(4.5.1) Lemma 9.2 (From Literature Reference No. 9)

Assume there are n players. For any $0<\epsilon$, $\delta<1$, there exists a construction of n committees of size $s=O(1/\delta\epsilon^2)$ such that if no more than $$\left(\frac{1}{2}-\epsilon\right)n$$

of the players are corrupt, then no more than δ·n committees will be corrupt (where a committee is corrupt if s/2 or more of its members are corrupt). The members of the committees can be computed in time n·poly log n.

For the protocol according to the principles of the present invention, committees of size s are used such that if c is the number of corrupt players in a committee, then c<s/3 means that the committee is "good" (as in Literature Reference No. 10). Since it is desired that the PMPC protocol have perfect security, the inner protocol must have perfect security. Also, all of the sub-protocols must take a constant number of rounds, so the inner protocol must take a constant number of rounds (per multiplication). The BGW protocol (see Literature Reference No. 4) is used for the inner protocol, since it satisfies both of these properties. The value of ε can be determined by the end user. Since the PMPC protocol was constructed to work with a threshold of t<n/8, then δ=1/8.

When virtualization is used and each player is replaced by a committee, communication between two players is replaced by communication between two committees. In addition, internal computations must be simulated by multiparty computation among the committee. If one examines all of the sub-protocols being used, then it is clear that there are only a few types of computations that need to be performed throughout the entire protocol: addition, multiplication of two private values, multiplication of a vector of shares by a publicly known hyper-invertible matrix, and the Berlekamp-Welch algorithm. Communication between committees and each type of internal computation is discussed individually below.

Suppose one committee wants to send a secret value to another committee. Denote the servers in the sending committed by $p_1^{send}, \ldots, p_s^{send}$ and the servers in the receiving committee by $p_1^{rec}, \ldots, p_s^{rec}$. Denote the evaluation point of $p_j^{send}$ and $p_j^{rec}$ by $\gamma_j$. So each $p_j^{send}$ holds a share $f_0(\gamma_j)$ of some polynomial $f_0$, where $f_0(0)$ is the secret to be transmitted. The sending servers generate c random polynomials of degree≤c, which are labeled $f_1, \ldots, f_c$. A description of how to generate these polynomial is given in Literature Reference No. 4. Then, each server in the sending committee sends his share of $f_0+\gamma_j f_1+\ldots+\gamma_j^c f_c$ to server $p_j^{rec}$, who then uses the Berlekamp-Welch algorithm to interpolate the polynomial. The constant term of this polynomial is recorded as $p_j^{rec}$'s share of the secret. Each server in the receiving committee now holds a share of the polynomial $f_0(0)+xf_1(0)+\ldots+x^c f_c(0)$, and the constant term of this polynomial is the secret. Thus, the transmission is complete. Note that it is much simpler for a committee to broadcast a value to all other committees, because then each member of the committee simply broadcasts his share of the secret. Additions are performed simply by adding shares as specified in the BGW protocol.

The only situation in which a committee needs to multiply two private values is when the committee needs to multiply two of its shares; this only occurs in the Multiply protocol (element 314). These multiplications will be handled as specified in the BGW protocol. Since the committee size is constant, this only requires a constant amount of computation per multiplication. Examining the BGW protocol, each multiplication requires seven communication rounds and six broadcast rounds.

In order to reduce the number of broadcasts used in the main protocol, all the broadcasts in the multiplication sub-protocol will be implemented with point-to-point channels using a broadcast protocol. The minimum number of rounds to implement a (deterministic) broadcast protocol for a committee with at most c corrupt servers is c+1 (see Literature Reference No. 12). Since c is a constant that depends on $\epsilon$, the protocol according to the principles of the present invention will work in a constant number of rounds. Any broadcast protocol that achieves the c+1 lower bound on the number of rounds and has communication and computational complexity polynomial in the number of committee members will work. For instance, as a non-limiting example, the protocol described in Literature Reference No. 16 may be used. This results in a total of 7+6(c+1)=13+6c rounds of communication per multiplication.

Multiplication by hyper-invertible matrices can be done efficiently in committees. Each committee member simply performs the required operations on their shares. Each hyper-invertible matrix in the PMPC protocol according to the principles of the present invention has dimension $\Theta(n)$ by $\Theta(n)$. Normally, such a computation would require $\Theta(m^2)$ multiplications. However, since the hyper-invertible matrices model polynomial interpolation and evaluation, one can use efficient algorithms from the computer science literature. For instance, Literature Reference No. 1 can be used to do these computations with only $O(n \text{ poly log}(n))$ multiplications.

The application of the Berlekamp-Welch algorithm in committees requires some care, because a straightforward application of the BGW protocol would lead to non-constant round complexity. The Berlekamp-Welch algorithm can be performed in $O(n \text{ poly log}(n))$ time (see Literature Reference No. 14). This adds a poly log(n) factor to the computational complexity, which is not problematic. However, it requires $O(\text{poly log}(n))$ rounds of communication, and the PMPC protocol must work in a constant number of rounds.

An alteration of the Berlekamp-Welch algorithm was constructed for committees that has constant round complexity. This requires generating extra masking randomness. In fact, for each polynomial to interpolate, an additional c polynomials must be generated. However, the committee size is fixed throughout the protocol (as it only depends on $\epsilon$). Therefore, generating these extra sharings does not affect the asymptotic complexity of the protocol.

When the PMPC protocol is virtualized, each execution of the Berlekamp-Welch algorithm is replaced with an execution of the protocol Committee-BW described below. The protocol uses RanDouSha (element 312) as a sub-protocol to generate random masking polynomials. The number of polynomials generated and the degrees of the polynomials will be different in different steps. For every polynomial the players want to interpolate, they generate c masking polynomials of the same degree. Again, this does not add to the overall communication complexity of the protocol since c is constant once $\epsilon$ is decided. Note that in some instances, a player/committee is not interpolating a polynomial, but rather a vector generated by a hyper-invertible matrix. However, since the hyper-invertible matrices used model polynomial interpolation, such a vector can be seen as a set of evaluation points on a polynomial.

The protocol Committee-BW implements a committee performing Berlekamp-Welch in a constant number of rounds. $\mathcal{P} = \{P_i\}_{i=1}^n$ is used to denote the set of committees and $\text{Com} = \{p_j\}_{j=1}^s$ to denote the committee that is to perform Berlekamp-Welch. The evaluation point of $P_i$ is $\alpha_i$ and the evaluation point of $p_j$ is $\gamma_j$. It is assumed that the polynomial f to be interpolated has already been sent to the committee. This means that each share $f(\alpha_i)$ is Shamir-shared among the committee as a polynomial $f(\alpha_i)$ of degree no more than c such that $f_{\alpha_i}(0) = f(\alpha_i)$. Furthermore, the committee holds an additional c polynomials, $r^{(1)}, \ldots, r^{(c)}$, shared with polynomials $r_{\alpha_i}^{(k)}$ of degree no more than c such that $r_{\alpha_i}^{(k)}(0) = r^{(k)}(\alpha_i)$. The protocol uses an s by c+1 hyper-invertible matrix M', which is publicly known and fixed throughout the PMPC protocol.

Committee-BW (c, Com, $\{f_{\alpha_i}\}_{i=1}^n$)
1. The committees invoke RanDouSha (element 312) to generate random polynomials $r^{(k)}$ for k=1, ..., c.
2. Each committee sends its shares of each $r^{(k)}$ to Com. Define $r_{\alpha_i}^{(k)}$ as described above.
3. Define polynomials $u^{(1)}, \ldots, u^{(s)}$ by $(u^{(1)}, \ldots, u^{(s)})^T = M'(f, r^{(1)}, \ldots, r^{(c)})^T$. Similarly, define $(u_{\alpha_i}^{(1)}, \ldots, u_{\alpha_i}^{(s)})^T = M'(f_{\alpha_i}, r_{\alpha_i}^{(1)}, \ldots, r_{\alpha_i}^{(c)})^T$ for each $P_i$. Each $p_j$ locally computes his share of each $u_{\alpha_i}^{(k)}$.
4. Each $p_j$ sends his share of $u_{\alpha_i}^{(k)}$ to $p_k$ for each $P_i$.
5. Each $p_j$ uses Berlekamp-Welch to interpolate $u_{\alpha_i}^{(k)}$ (and hence $u^{(k)}(\alpha_i)$) from the shares received in the previous step.
6. Each $p_j$ uses Berlekamp-Welch to interpolate $u^{(k)}$, noting which shares he believes to be incorrect.
7. Each $p_j$ sends to each member of Com the index of each committee $P_i$ which he believes to have sent an incorrect share (these are called "negative votes").
8. For each $\alpha_i$ that received more than c negative votes in the previous step, the committee Com concludes that committee $P_i$ is corrupt, and his share of f is unneeded (even if the value of $f(\alpha_i)$ sent by $P_i$ was correct). Let I be the set of all i such that $P_i$ was not deemed to be corrupt.
9. Suppose the committee wants to interpolate a set of points $\xi_1, \ldots, \xi_m$. Let $\{\lambda_i^{(k)}\}_{i \in I}$ denote the Lagrange coefficients for interpolating the point $\xi_k$ on a polynomial using the points $\{\alpha_i\}_{i \in I}$. Each $p_j$ locally computes his share of $f(\xi_k)$ for each k=1, ..., m by $$f_{\xi_k}(\gamma_j) = \sum_{i \in I} \lambda_i^{(k)} f_{\alpha_i}(\gamma_j).$$

The PMPC protocol according to the principles of the present invention can be used to perform any form of computation that can be represented by an arithmetic circuit (over a finite field) in a secure and resilient manner. Such a protocol can be used for various forms of computation including, but not limited to, storing and performing computations (and/or data mining, querying, searching, and updating) in a distributed database, securing distributed control systems in critical infrastructure (e.g., power grids), online auctioning, and secure voting.

Additionally, the PMPC protocol could be used to realize a resilient and secure control plane to operate, monitor, and ensure correct behavior of a cloud computing infrastructure. For instance, the PMPC protocol would allow a vehicle to distribute sensitive data (e.g., location, speed, mileage) among a cloud to perform diagnostics such that the data remains secure even if some of the servers in the cloud are compromised.

Furthermore, the system according to the principles of the present invention could be used for distributed computation performed by unmanned aerial vehicles (UAVs). For instance, in a group of UAVs collecting data, each individual UAV could distribute the data it collects among the group, and the group could then perform computations on the data. The PMPC protocol would ensure that capturing or destroying some fraction of the UAVs does not reveal any hidden data or disrupt computation.

What is claimed is:

1. A system for secure proactive multi-party computation, the system comprising:
one or more processors and a non-transitory computer-readable medium having executable instructions encoded thereon such that when executed, the one or more processors perform operations of:
securely evaluating a circuit in the presence of an adversary, wherein the circuit receives inputs of secret values from a set of servers of a synchronous network, and wherein inputs of secret values are transmitted electronically via a secure authenticated broadcast channel;
wherein the circuit is divided into a plurality of layers, and wherein the circuit comprises at least one of input gates, random gates, addition gates, multiplication gates, and output gates;
wherein the circuit is securely evaluated as follows:
  i. initializing a RobustShare protocol to allow each server in the set of servers to distribute their inputs of secret values among other servers in the set of servers;
  ii. initializing a RanDouSha protocol to generate random sharings of the secret values for each random gate in the circuit;
  iii. initializing a Block-Redistribute protocol to redistribute the secret values amount the set of servers;
  iii. for each layer of the circuit, performing a permutation of the secret values;
  iv. evaluating each layer of the circuit;
  v. initializing the Block-Redistribute protocol to re-randomize the secret values such that privacy of the secret values is preserved;
  vi. determining a sharing of the secret values for each output gate;
  vii. initializing a Reco protocol to reveal each sharing of secret values to an intended recipient; and
  viii. periodically erasing, by each server, the secret values to preserve security against an adversary.

2. The system as set forth in claim 1, wherein the one or more processors further perform an operation of transforming the circuit such that all addition gates and multiplication gates have only two inputs and either one or two outputs.

3. The system as set forth in claim 2, wherein the one or more processors further perform operations of:
decomposing the permutation of the secret values into a set of sub-permutations; and
performing each of the sub-permutations in the set of sub-permutations in succession.

4. The system as set forth in claim 3, wherein the adversary may only corrupt a fixed fraction of servers in the set of servers at a given time.

5. The system as set forth in claim 4, wherein the system provides perfect security, such that a probability of the adversary compromising the security of the evaluation of the circuit is zero.

6. The system as set forth in claim 1, wherein the system provides perfect security, such that a probability of the adversary compromising the security of the evaluation of the circuit is zero.

7. The system as set forth in claim 1, wherein the circuit is securely evaluated to ensure correct behavior of a cloud computing infrastructure.

8. The system as set forth in claim 1, wherein the circuit is securely evaluated for distributed computation performed by vehicles.

9. A computer-implemented method for secure proactive multi-party computation, comprising:
an act of causing a data processor to execute instructions stored on a non-transitory memory such that upon execution, one or more processors perform operations of:
securely evaluating a circuit in the presence of an adversary, wherein the circuit receives inputs of secret values from a set of servers of a synchronous network, and wherein inputs of secret values are transmitted electronically via a secure, authenticated broadcast channel;
wherein the circuit is divided into a plurality of layers, and wherein the circuit comprises at least one of input gates, random gates, addition gates, multiplication gates, and output gates;
wherein the circuit is securely evaluated as follows:
  i. initializing a RobustShare protocol to allow each server in the set of servers to distribute their inputs of secret values among other servers in the set of servers;
  ii. initializing a RanDouSha protocol to generate random sharings of the secret values for each random gate in the circuit;
  iii. initializing a Block-Redistribute protocol to redistribute the secret values amount the set of servers;
  iii. for each layer of the circuit, performing a permutation of the secret values;
  iv. evaluating each layer of the circuit;
  v. initializing the Block-Redistribute protocol to re-randomize the secret values such that privacy of the secret values is preserved;
  vi. determining a sharing of the secret values for each output gate; and
  vii. initializing a Reco protocol to reveal each sharing of secret values to an intended recipient; and
  viii. periodically erasing, by each server, the secret values to preserve security against an adversary.

10. The method as set forth in claim 9, wherein the one or more processors perform an operation of transforming the circuit such that all addition gates and multiplication gates have only two inputs and either one or two outputs.

11. The method as set forth in claim 10, wherein the one or more processors further perform operations of:
decomposing the permutation of the secret values into a set of sub-permutations; and
performing each of the sub-permutations in the set of sub-permutations in succession.

12. The method as set forth in claim 11, wherein the adversary may only corrupt a fixed fraction of servers in the set of servers at a given time.

13. The method as set forth in claim 12, wherein the system provides perfect security, such that a probability of the adversary compromising the security of the evaluation of the circuit is zero.

14. The method as set forth in claim 9, wherein the system provides perfect security, such that a probability of the adversary compromising the security of the evaluation of the circuit is zero.

15. A computer program product for secure proactive multi-party computation, the computer program product comprising computer-readable instructions stored on a non-transitory computer-readable medium that are executable by a computer having a processor for causing the processor to perform operations of:

securely evaluating a circuit in the presence of an adversary, wherein the circuit receives inputs of secret values from a set of servers of a synchronous network, and wherein inputs of secret values are transmitted electronically via a secure, authenticated broadcast channel;

wherein the circuit is divided into a plurality of layers, and wherein the circuit comprises at least one of input gates, random gates, addition gates, multiplication gates, and output gates;

wherein the circuit is securely evaluated as follows:
  i. initializing a RobustShare protocol to allow each server in the set of servers to distribute their inputs of secret values among other servers in the set of servers;
  ii. initializing a RanDouSha protocol to generate random sharings of the secret values for each random gate in the circuit;
  iii. initializing a Block-Redistribute protocol to redistribute the secret values amount the set of servers;
  iii. for each layer of the circuit, performing a permutation of the secret values;
  iv. evaluating each layer of the circuit;
  v. initializing the Block-Redistribute protocol to re-randomize the secret values such that privacy of the secret values is preserved;
  vi. determining a sharing of the secret values for each output gate; and
  vii. initializing a Reco protocol to reveal each sharing of secret values to an intended recipient; and
  viii. periodically erasing, by each server, the secret values to preserve security against an adversary.

16. The computer program product as set forth in claim 15, further comprising instructions for causing the processor to perform an operation of transforming the circuit such that all addition gates and multiplication gates have only two inputs and either one or two outputs.

17. The computer program product as set forth in claim 16, further comprising instructions for causing the processor to perform operations of:
  decomposing the permutation of the secret values into a set of sub-permutations; and
  performing each of the sub-permutations in the set of sub-permutations in succession.

18. The computer program product as set forth in claim 17, wherein the adversary may only corrupt a fixed fraction of servers in the set of servers at a given time.

19. The computer program product as set forth in claim 18, wherein the system provides perfect security, such that a probability of the adversary compromising the security of the evaluation of the circuit is zero.

20. The computer program product as set forth in claim 15, wherein the system provides perfect security, such that a probability of the adversary compromising the security of the evaluation of the circuit is zero.

* * * * *